(12) United States Patent
Lai et al.

(10) Patent No.: US 8,135,093 B2
(45) Date of Patent: Mar. 13, 2012

(54) CARRIER FREQUENCY OFFSET ESTIMATION METHOD AND SYSTEM

(75) Inventors: Jiun-Yo Lai, Taichung (TW); Jen-Yuan Hsu, Kinmen County (TW); Chin-Hung Chen, Tainan (TW); Pang-An Ting, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 967 days.

(21) Appl. No.: 12/118,632

(22) Filed: May 9, 2008

(65) Prior Publication Data

US 2008/0260076 A1    Oct. 23, 2008

Related U.S. Application Data

(63) Continuation-in-part of application No. 11/785,520, filed on Apr. 18, 2007, now Pat. No. 7,809,344.

(30) Foreign Application Priority Data

Jun. 8, 2007    (TW) ................................ 96120706 A

(51) Int. Cl.
H04L 27/06    (2006.01)

(52) U.S. Cl. .................... 375/326; 375/344; 375/229

(58) Field of Classification Search ............... 375/326, 375/394, 229
See application file for complete search history.

(56) References Cited

U.S. PATENT DOCUMENTS

| | | | |
|---|---|---|---|
| 2002/0154688 A1 * | 10/2002 | Pollmann et al. | 375/229 |
| 2006/0114812 A1 | 6/2006 | Kim et al. | |
| 2007/0097980 A1 | 5/2007 | Kalhan et al. | |
| 2007/0280098 A1 * | 12/2007 | Bhatt et al. | 370/208 |

FOREIGN PATENT DOCUMENTS

CN    1964337 A    5/2007

OTHER PUBLICATIONS

Taiwan Patent Office, Office Action, Taiwan Patent Application Serial No. 096120706, Nov. 26, 2010, Taiwan.

* cited by examiner

*Primary Examiner* — Kenneth Lam
*Assistant Examiner* — Michael Neff

(57) ABSTRACT

In one aspect of the invention, a carrier frequency offset (CFO) estimation method to estimate a CFO value of a received signal is provided, and the method comprises: receiving a preamble signal which includes several non-perfect repeat segments; applying an interpolation procedure to interpolate the perfect repeat point of one segment compared with the next segment or the previous segment; acquiring a delay correlation value based on the two perfect repeat signal segments and estimating the CFO value based on the delay correlation value.

18 Claims, 7 Drawing Sheets

CARRIER FREQUENCY OFFSET ESTIMATION METHOD AND SYSTEM

BACKGROUND OF THE INVENTION

1. Field of the Invention

The present invention relates to a wireless system, and more particularly to a carrier frequency offset estimation method and system.

2. Description of the Related Art

Conventionally, a carrier frequency offset value is usually calculated by the delay correlation value in time axis, and a basic requirement of the carrier frequency offset estimation method is that the preamble signal comprises at least two identical signals, wherein the two identical signals may be composed of two or more OFDM (Orthogonal Frequency Division Multiplexing) symbols, or two or more identical signals in one OFDM symbol. According to the identical feature, a delay correlation value generated by the two identical signals can be used to estimate the carrier frequency offset value. The basic idea can be interpreted by the following equations.

$$z = \sum_{n=0}^{N-1} r_n r_{n+D}^*$$
$$= \sum_{n=0}^{N-1} s_n e^{j2\pi f_\Delta n T_s} (s_{n+D} e^{j2\pi f_\Delta (n+D) T_s})^*$$
$$= e^{-j2\pi f_\Delta D T_s} \sum_{n=0}^{N-1} |s_n|^2,$$

wherein z is a delay correlation function to show the sum of the product of data value at two corresponding position in the received signal;

$r_n$ is the data value at $n^{th}$ point of the received signal;
$r_{n+D}$ is the data value at $(n+D)^{th}$ point of the received signal;
$s_n$ is the data value at $n^{th}$ point of the transmitted signal;
$s_{n+D}$ is the data value at $(n+D)^{th}$ point of the transmitted signal;
$f_\Delta$ is the carrier frequency offset;
$T_s$ is sampling period;
D is the delay length, wherein the data value at $n^{th}$ point of the received signal is the same as the data value at $(n+D)^{th}$ point of the received signal when no noise and frequency offset occur; and

* means to calculate the corresponding complex conjugate.

According to the delay correlation function, it can be found that the carrier frequency offset is determined based on the phase of the function, and the carrier frequency offset can be acquired after the phase of the function is normalized. The carrier frequency offset can be shown as the following:

$$\hat{f}_\Delta = -\frac{1}{2\pi D T_s} \angle z$$

In the standard of IEEE 802.16e, the preamble symbol has three repeat segments in time domain and the delay correlation technique can be applied to the carrier frequency offset estimation. However, after sampling, the three repeat signals may not have the repeat feature. In other words, a phase offset is generated and this causes an undesired phase term, wherein the undesired phase term is different according to the preamble signals in different sectors. Please refer to FIGS. 1a and 1b. FIG. 1a and FIG. 1b are schematic diagrams of data values determined by sampling the three repeat signals with different sampling rates in the discrete time domain. In FIG. 1a, we find that the data values at the corresponding positions in the three repeat signals are the same and this is because the three repeat signals are sampled by 9 points. However, in the FIG. 1b, the data values at the corresponding positions in the three repeat signals are different and this is because the three repeat signals are sampled by 10 points. In the IEEE 802.16e standard, the preamble signal has three-repeat feature. But in the receiver design, if the sampling rate is not the threefold system bandwidth or multiple of 3, say, twofold or fourfold. In such cases, it will cause the same phenomenon shown in FIG. 1b and the undesired phase term is generated during the delay correlation computing procedure. The described phenomenon can also be observed by mathematical operations. Please refer to the following equations.

$$z = \sum_{n=0}^{N-1} r_n r_{n+D}^* \quad \text{(Eq. 1)}$$
$$= \sum_{n=0}^{N-1} a_n e^{j2\pi f_\Delta n T_s} (a_{n+D} e^{j2\pi f_\Delta (n+D) T_s})^*$$
$$= e^{-j2\pi f_\Delta D T_s} \sum_{n=0}^{N-1} |a_n|^2$$

$$z = \sum_{n=0}^{N-1} r_n r_{n+D}^* \quad \text{(Eq. 2)}$$
$$= \sum_{n=0}^{N-1} a_n e^{j2\pi f_\Delta n T_s} (a_{n+D} e^{j2\pi f_\Delta (n+D) T_s})^*$$
$$= e^{-j2\pi f_\Delta D T_s} \sum_{n=0}^{N-1} |a_n| e^{j\theta_n} |a_{n+D}| e^{-j\theta_{n+D}}$$
$$= e^{-j2\pi f_\Delta D T_s} \sum_{n=0}^{N-1} |a_n| \cdot |a_{n+D}| e^{-j(\theta_{n+D} - \theta_n)}$$
$$= e^{-j2\pi f_\Delta D T_s} \sum_{n=0}^{N-1} |A_n| e^{j\Theta}$$

The equation Eq. 1 shows the delay correlation of the signal with repeat feature. The equation Eq. 2 shows the delay correlation of the signal with non-perfect repeat feature. According to the equation Eq. 2, an undesired phase term $\Theta_n$ is generated, and after eliminating the undesired phase term, $\Theta_n$, the accurate carrier frequency offset is then calculated.

BRIEF SUMMARY OF THE INVENTION

One exemplary of an embodiment of the invention is to use an interpolation filter to receive a sampled signal with unideal repeat features to generate repeat signals and another objective is to use the carrier frequency offset estimation method based on the delay signal correlation to estimate the carrier frequency offset value.

In one exemplary of the invention, a carrier frequency offset (CFO) estimation method to estimate a CFO value of a received signal is provided, and the method comprises: receiving a preamble signal including a first repeat signal segment and a second repeat signal segment; applying an interpolation procedure on the first or the second unideal repeat signal to generate a perfect repeat signal with the second or the first signal; and acquiring a delay correlation value based on the first signal and the second repeat signal and estimating the CFO value based on the delay correlation value.

In another exemplary of the invention, a carrier frequency offset (CFO) estimation system to estimate a CFO value of a received signal is provided, and the system comprises a conjugate signal generator comprising an interpolation filter and a computing unit, a first multiplier, and a carrier frequency offset estimator. The conjugate signal generator receives the first repeat signal to generate a first conjugate signal corresponding to the second repeat signal by the interpolation filter and the computing unit. The first multiplier calculates a first product of the second repeat signal and the first conjugate signal. The carrier frequency offset estimator estimates the carrier frequency offset value based on the first product.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
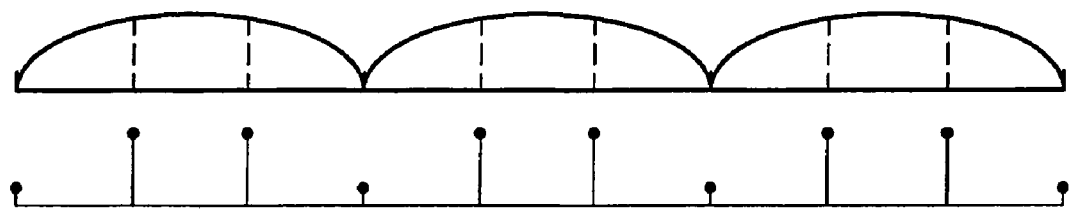
FIG. 1a and FIG. 1b are schematic diagrams of data values determined by sampling the three repeat signals with different sampling rates in the discrete time domain.
Figure 1B:
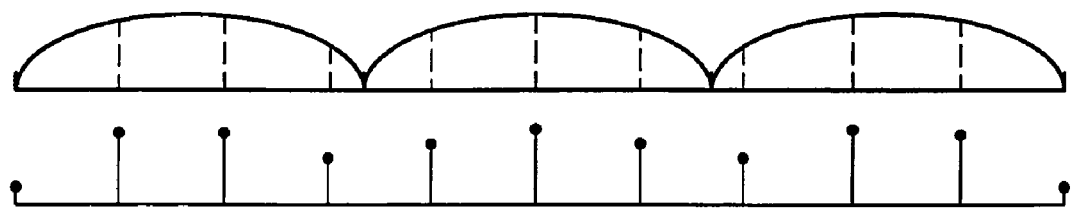
Figure 2:
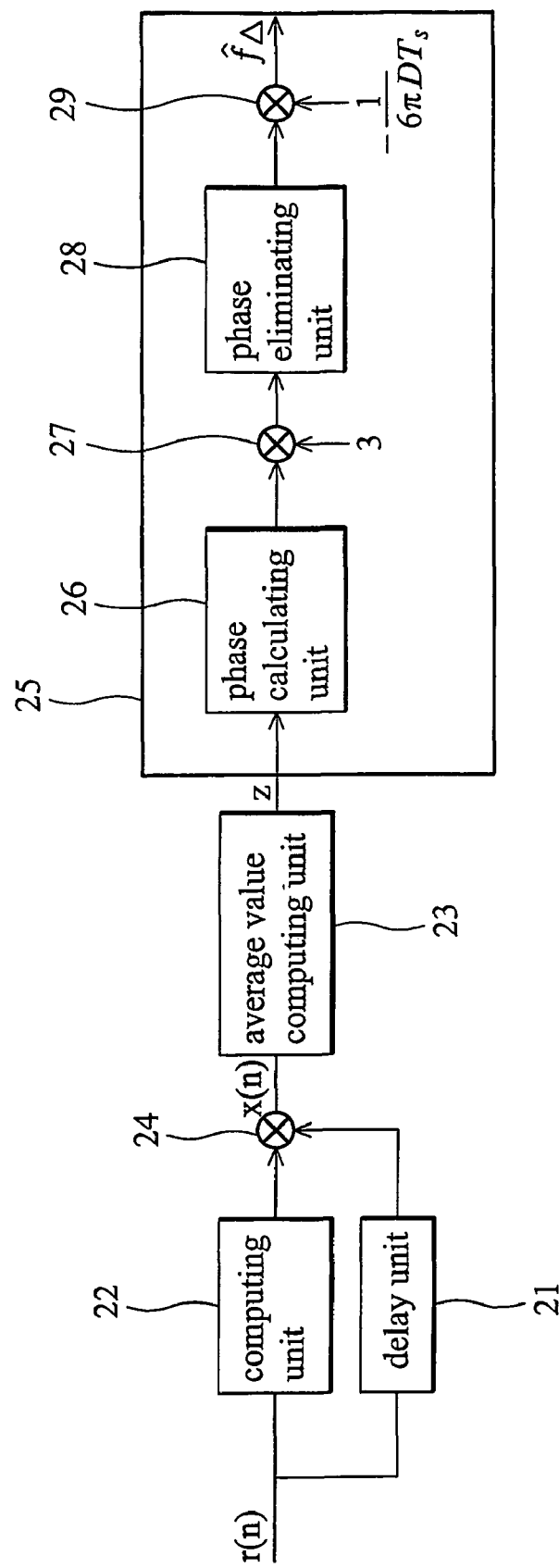
FIG. 2 is a block diagram of an embodiment of a carrier frequency offset estimation system according to the invention.

FIG. 2 is a block diagram of an embodiment of a carrier frequency offset estimation system capable of reducing the unideal phase term during the carrier frequency offset estimation process. The delay unit 21 receives and delays the input signal r(n) for D sample points, wherein D is the length of the repeat signal in the input signal. In other words, the delay unit 21 is a memory device, such as a shift register or memory. The delay unit 21 receives and stores the data from r(n) to r(n+D−1), and when the delay unit 21 receives the data of r(n+D), the delay unit 21 transmits the data of r(n). The computing unit 22 receives the input signal r(n) directly and calculates the corresponding complex conjugate. The multiplier 24 multiplies the signal r(n+D) with the output signal from the computing unit 22 r(n) to acquire signal x(n). If $r_n$ represents the data value of the $n^{th}$ sample point of the signal r(n) and $r_{n+D}$ represents the data value of the $(n+D)^{th}$ sample point of the signal r(n+D), the data value of the $n^{th}$ sample point of the signal x(n), $x_n$, can be expressed as follows:

$$x_n = r_n r^*_{n+D}$$

An average value computing unit 23 receives a plurality of data values of signal x(n) to calculate an average value and a delay correlation value z is determined based on the average value. The carrier frequency offset estimator 25 estimates a carrier frequency offset value $\hat{f}_\Delta$ based on the delay correlation value z. In this embodiment, the carrier frequency offset estimator 25 further comprises a phase calculating unit 26, multipliers 27 and 29 and a phase eliminating unit 28. The phase calculating unit 26 receives the delay correlation value z to calculate a phase angle $\angle z$. In an embodiment of IEEE 802.16e standard, the unideal phases generated by the preamble signal of the three sectors are approximately 0, +/−2π/3. Thus, the unideal phase can be roughly eliminated by multiplying the phase angle by 3. Based on the described phenomenon, the multiplier 27 multiplies the phase angle by 3 and the phase eliminating unit 28 removes +/−2π to eliminate the unideal phase offset. The multiplier 29 multiplies the phase angle $\angle z$ with a compensation value $$-\frac{1}{6\pi DT_s}$$

to acquire the carrier offset value $\hat{f}_\Delta$, wherein D is the length of the repeat signal in the input signal and $T_s$ is sampling period of the input signal. The delay correlation value can be calculated by the following equations.

$$z = \sum_{n=0}^{N-1} r_n r^*_{n+D}$$

$$= \sum_{n=0}^{N-1} s_n e^{j2\pi f_\Delta nT_s} (s_{n+D} e^{j2\pi f_\Delta (n+D)T_s})^*$$

$$= e^{-j2\pi f_\Delta DT_s} \sum_{n=0}^{N-1} |s_n||s_{n+D}| e^{j\varphi_n}$$

$$= C \cdot e^{-j2\pi f_\Delta DT_s} e^{j\Phi}$$

In the IEEE 802.16e standard, the $\Phi$ of the preamble signal in different sectors, are approximately 0°, 120° and −120° (or 0, 2π/3, −2π/3 in radian unit), respectively. Thus, the phase angle of the delay correlation value z can be expressed as the following three equation:

$$\angle z_1 = -2\pi f_\Delta DT_s$$

$$\angle z_2 = -2\pi f_\Delta DT_s + 2\pi/3$$

$$\angle z_3 = -2\pi f_\Delta DT_s - 2\pi/3$$

The three equations are multiplied by 3 and added to eliminate the term of +/−360°. Similarly, the computing unit 22 can be coupled between the input signal r(n) and the delay unit 21 or between the delay unit 21 and the multiplier 29, wherein the compensation value is changed to $$\frac{1}{6\pi DTs}$$

in case of the arrangement.

Figure 3:
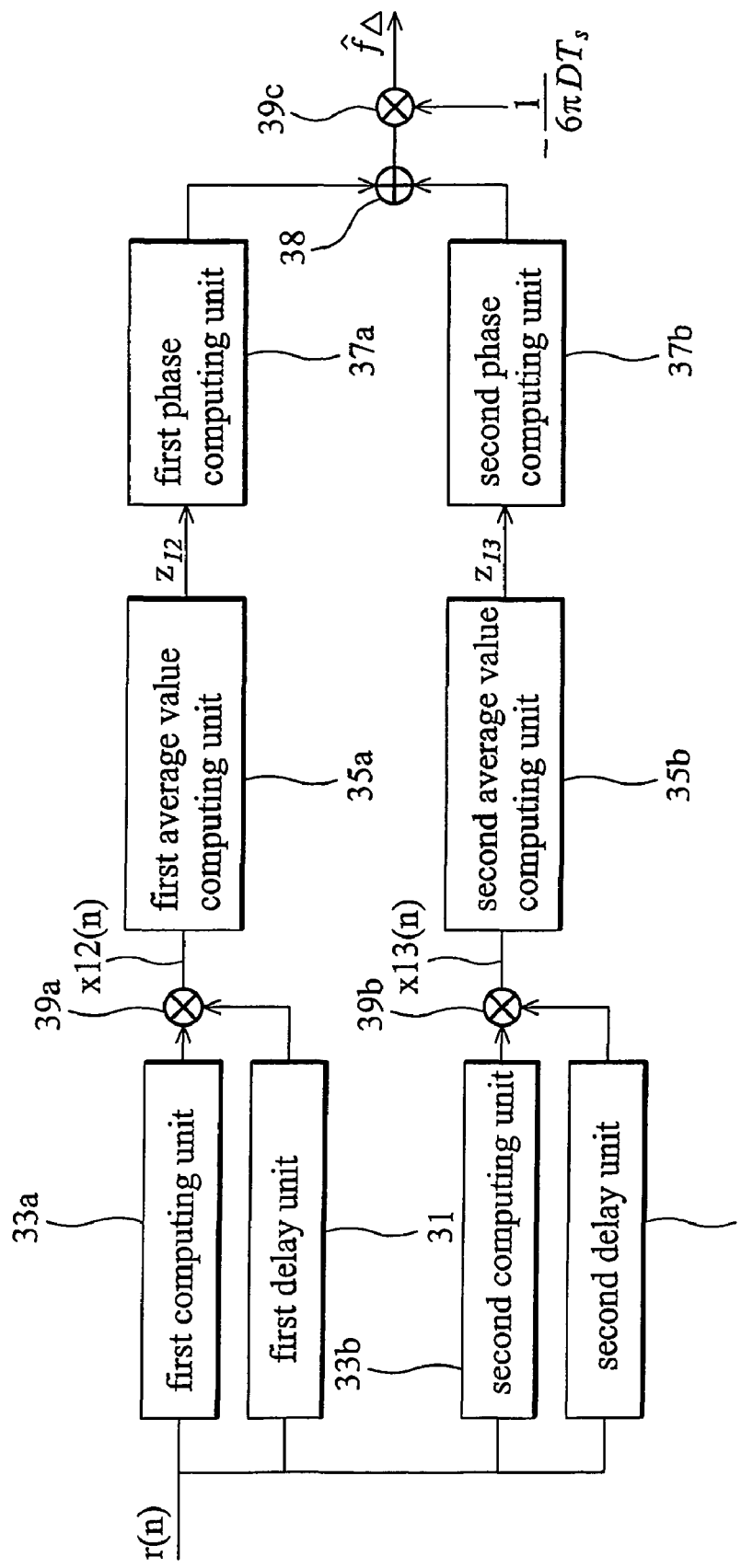
FIG. 3 is a block diagram of another carrier frequency offset estimation system capable of reducing the unideal phase term during the carrier frequency offset estimation procedure.

FIG. 3 is a block diagram of another carrier frequency offset estimation system capable of reducing the unideal phase term during the carrier frequency offset estimation procedure. The CFO estimation system of FIG. 3 considers three repeat signals of the preamble to calculate not only the first delay correlation value of the first repeat signal and the second repeat signal, but also a second delay correlation value of the first repeat signal and the third repeat signal. The related equations are shown as follows:

$$z_{12} = \sum_{n=0}^{N-1} r_n r_{n+D}^*$$
$$= \sum_{n=0}^{N-1} s_n e^{j2\pi f_\Delta nT_s} (s_{n+D} e^{j2\pi f_\Delta (n+D)T_s})^*$$
$$= e^{-j2\pi f_\Delta DT_s} \sum_{n=0}^{N-1} |s_n||s_{n+D}|e^{j\varphi_n}$$
$$= C \cdot e^{-j2\pi f_\Delta DT_s} e^{j\Phi}$$

$$z_{13} = \sum_{n=0}^{N-1} r_n r_{n+2D}^*$$
$$= \sum_{n=0}^{N-1} s_n e^{j2\pi f_\Delta nT_s} (s_{n+2D} e^{j2\pi f_\Delta (n+2D)T_s})^*$$
$$= e^{-j2\pi f_\Delta 2DT_s} \sum_{n=0}^{N-1} |s_n||s_{n+2D}|e^{j\theta_n}$$
$$= C_2 \cdot e^{-j2\pi f_\Delta 2DT_s} e^{j\Theta}$$

$z_{12}$ represents the first delay correlation value and $z_{13}$ represents the second delay correlation value. In the described equation, $\Phi$ and $\Theta$ respectively represents the phase offset caused by the non-perfect repeat feature of the three repeat signals ($|s_n| \neq s_{n+D}| \neq s_{n+2D}|$). According to the experimental result, the two phase offsets $\Phi$ and $\Theta$ have almost reverse property, in other words, $\Phi = -\Theta$. Therefore, we can add the two phase of the two delay correlation values to eliminate non-ideal phase offset and acquire the carrier frequency offset. The related equation is shown as follows:

$$z = z_{12} \times z_{13}$$
$$= C_1 \times C_2 \times e^{-j6\pi f_\Delta DT_s} e^{j(\Phi+\Theta)}$$
$$= C_1 \times C_2 e^{-j6\pi f_\Delta DT_s}$$

Then, the carrier frequency offset can be determined by the following equation:

$$\hat{f}_\Delta = -\frac{1}{6\pi DT_s} \angle z$$

The first delay unit 31 receives the input signal r(n) and delays D sample points, wherein D is the length of the repeat signal in the input signal. In other words, the first delay unit 31 delays the first repeat signal of the three repeat signals. The first computing unit 33a receives the input signal and executes a first complex conjugate operation corresponding to the first repeat signal. The multiplier 39a multiples the signal r*(n+D) with the output signal r(n) from the first delay unit 31 to generate signal $x_{12}(n)$. The first average value computing unit 35a is an accumulator, which receives the data values of the signal $x_{12}(n)$ and accumulate for N values then generates a first delay correlation value $z_{12}$ based on the first average value. The first phase computing unit 37a receives the delay correlation value $z_{12}$ and generates corresponding phase angle $\angle z_{12}$.

The second delay unit 32 receives the input signal r(n) and delays 2D sample points, wherein D is the length of the repeat signal in the input signal. In other words, the second delay unit 32 delays the first repeat signal and the second repeat signal of the three repeat signals. The second computing unit 33b receives the input signal and executes a second complex conjugate operation corresponding to the second repeat signal. The multiplier 39b multiples the signal r*(n+2D) with the output signal r(n) from the second delay unit 32 to generate signal $x_{13}(n)$. The second average value computing unit 35b receives the data values of the signal $x_{13}(n)$ to calculate a second average value and generates a second delay correlation value $z_{13}$ based on the second average value. The second phase computing unit 37b receives the delay correlation value $z_{13}$ and generates corresponding phase angle $\angle z_{13}$. The adder 38 adds the phase angle $\phi z_{12}$ and the phase angle $\angle z_{13}$ to get a phase angle $\angle z$.

In another embodiment of the invention, a multiplier may be adapted to multiply the first delay correlation value by the second delay correlation value, and then the product of the first delay correlation value and the second delay correlation value is fed to a phase computing unit, such as the first phase computing unit 37a or the second phase computing unit 37b, to estimate the phase angle $\angle z$. The multiplier 39c multiplies the phase angle $\angle z$ with a compensation value $$-\frac{1}{6\pi DTs}$$

to acquire the carrier offset value $\hat{f}_\Delta$. In this embodiment, the first computing 33a is parallel coupled with the first delay unit 31, however, the first computing unit 33a can be cascaded with the first delay unit 31. In other words, the first computing unit 33a can be coupled between the input signal r(n) and the first delay unit 31 or between the first delay unit 31 and the multiplier 39a. Similarly, the second computing unit 33b can be coupled between the input signal r(n) and the second delay unit 32 or between the second delay unit 32 and the multiplier 39b, wherein the compensation value is changed to $$\frac{1}{6\pi DTs}$$

in case of the arrangement.

Figure 4:
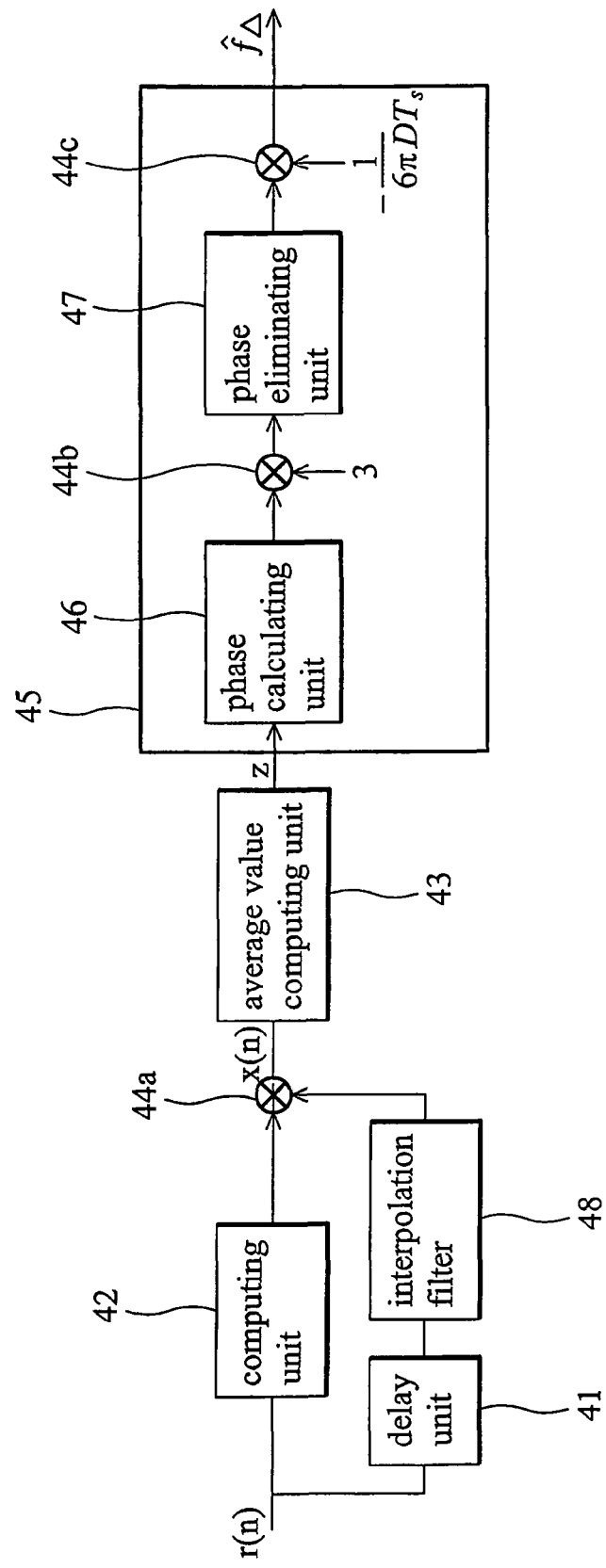
FIG. 4 is a block diagram of another embodiment of the carrier frequency estimation system according to the invention.

FIG. 4 is a block diagram of another embodiment of the carrier frequency estimation system according to the invention. The delay unit 41 receives the input signal r(n) and delays D sample points, wherein D is the length of the repeat signal in the input signal. In other words, the delay unit 41 delays the first repeat signal of the three repeat signals. The interpolation filter 48 processes the first repeat signal and acquires an over-sampled signal by an interpolation procedure with three times sampling rate.

Figure 5:
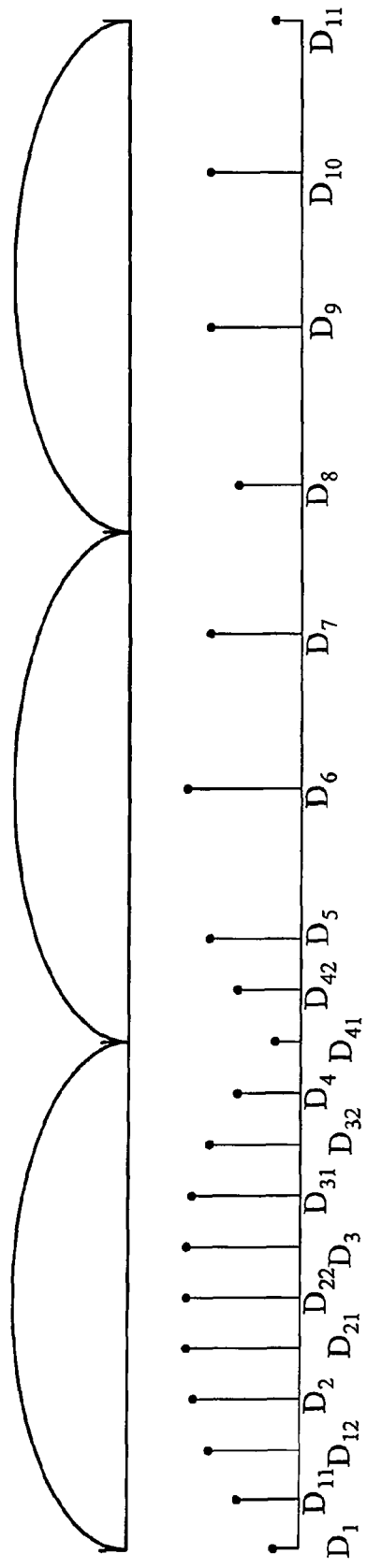
FIG. 5 is a schematic diagram of the output data value of the interpolation filter 48 in FIG. 4 after inputting an input data r(n) into the interpolation filter 48.

For further discussion with the operation of interpolation filter 48, please refer to FIG. 5. FIG. 5 is a schematic diagram of the output data value of the interpolation filter 48 after inputting an input data r(n) into the interpolation filter 48. Since a first signal with better repeat feature with the second repeat signal $[D_5, D_6, D_7]$ is required, an interpolation procedure is applied to calculate the data values of each trisection point between $D_1$ and $D_2$, $D_2$ and $D_3$, and $D_3$ and $D_4$, such as $D_{11}, D_{12}, D_{21}$ and $D_{22}$. Then, the interpolation filter 48 selects corresponding data values based on the position of the second repeat signal $[D_5, D_6, D_7]$ to generate the first signal. In this embodiment, the first signal is composed of the data values $D_{12}, D_{22}$ and $D_{32}$.

Figure 6:
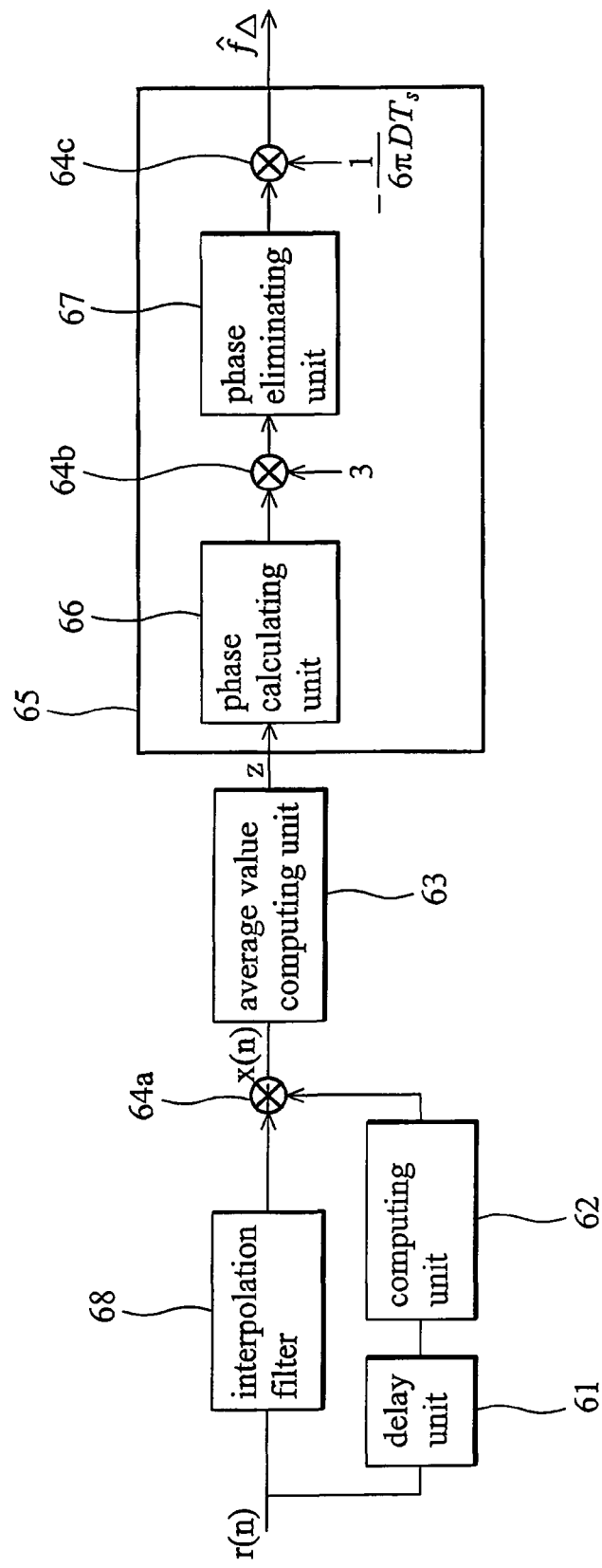
FIG. 6 is a block diagram of another embodiment of the carrier frequency estimation system according to the invention.
Figure 7:
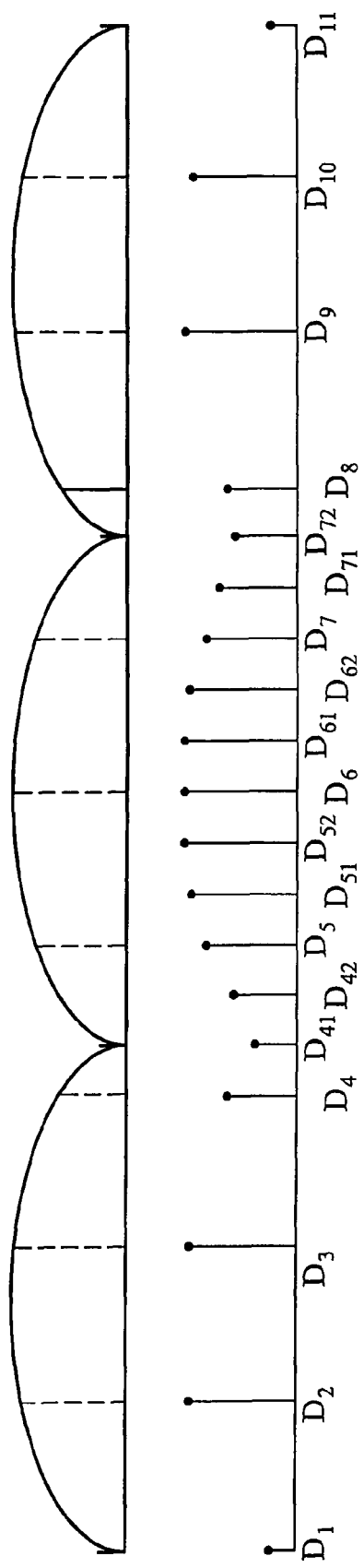
FIG. 7 is a schematic diagram of the output data value of the interpolation filter 68 in FIG. 6 after inputting an input data r(n) into the interpolation filter 68.

In addition, except for the position of the interpolation filter 48 designed in the position shown of FIG. 4, the interpolation filter 48 can also be designed at the position between the input signal and the delay unit 41, or in another path, such as the interpolation filter 68 shown in FIG. 6. Furthermore, the delay unit 41 and the computing unit 42 can be cascaded connected or in different paths, and the interpolation filter 48 can be designed at the position before or after the computing unit 42. FIG. 7 illustrates the operation of the interpolation filter 68 with the second repeat signal. Referring to FIG. 7, FIG. 7 is a schematic diagram of the output data value of the interpolation filter 68 after inputting an input data r(n) into the interpolation filter 68. Since a first signal with better repeat feature with the second repeat signal $[D_1, D_2, D_3, D_4]$ is required, an interpolation procedure is applied to calculate the data values of each trisection point between $D_4$ and $D_5$, $D_5$ and $D_6$, $D_6$ and $D_7$, and $D_7$ and $D_8$, such as $D_{41}, D_{42}, D_{51}, D_{52}, D_{61}$ and $D_{62}$. Then, the interpolation filter 68 selects corresponding data values based on the position of the second repeat signal $[D_1, D_2, D_3, D_4]$ to generate the first signal. In this embodiment, the first signal is composed of the data values $D_{41}, D_{51}, D_{61}$ and $D_{71}$.

The computing unit 42 receives the first signal from input r(n) to generate a first conjugate signal, wherein the first conjugate signal is composed of the complex conjugate values of corresponding data values in the first signal. The multiplier 44a multiplies the signal r(n+D) with the output signal of the computing unit 42 to generate the signal x(n). The average value computing unit 43 receives a plurality of data values of signal x(n) to calculate an average value and a delay correlation value z is determined based on the average value. The carrier frequency offset estimator 45 estimates a carrier frequency offset value $\hat{f}_A$ based on the delay correlation value z. In this embodiment, the carrier frequency offset estimator 45 further comprises a phase calculating unit 46, multipliers 44b and 44c and a phase eliminating unit 47. The phase calculating unit 46 receives the delay correlation value z to calculate a phase angle $\angle z$. In an embodiment of IEEE 802.16e standard, the unideal phases generated by the preamble signal of the three sectors are approximately 0, +/−2π/3. Thus, the unideal phase can be roughly eliminated by multiplying the phase angle by 3. Based on the described phenomenon, the multiplier 27 multiplies the phase angle by 3 and the phase eliminating unit 28 removes +/−2π to eliminate the unideal phase offset. The multiplier 44c multiplies the phase angle $\angle z$ with a compensation value $$-\frac{1}{6\pi D T s}$$

to acquire the carrier offset value $\hat{f}_A$, wherein D is the length of the repeat signal in the input signal and $T_s$ is sampling period of the input signal.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A carrier frequency offset estimation method to estimate a carrier frequency offset value of a received signal, comprising:
receiving a preamble signal including a first repeat signal segment and a second repeat signal segment;
applying an interpolation procedure on the first repeat signal to generate a first signal; and
acquiring a delay correlation value based on the first and the second repeat signals and estimating the carrier frequency offset value based on the delay correlation value, wherein the interpolation procedure comprises:
determining data values of a plurality of interpolation points based on at least two sampling point of the first repeat signal; and
selecting corresponding data values from the sampling points of the first repeat signal and the interpolation points based on positions of the second repeat signal to generate the first signal.

2. The method as claimed in claim 1, further comprising:
determining a first conjugate signal; and
multiplying the first conjugate signal by the second repeat signal to acquire the delay correlation value.

3. The method as claimed in claim 1, further comprising acquiring a phase angle based on the delay correlation value and estimating the carrier frequency offset value based on the phase angle.

4. The method as claimed in claim 1, further comprising:
acquiring a phase angle based on the delay correlation value;
multiplying the phase angle by a predetermined value; and
determining a difference between the product of the phase angle and the predetermined value and a phase rotation value of the received signal to estimate the carrier frequency offset value based on the difference.

5. The method as claimed in claim 4, wherein the predetermined value is 3.

6. The method as claimed in claim 4, wherein the phase rotation value is 0, 2π or −2π.

7. The method as claimed in claim 4, further comprising multiplying the difference by a compensation value.

8. The method as claimed in claim 7, wherein the compensation value is, wherein D is the length of the repeat part in the preamble signal, and Ts is a sampling rate of the received signal.

9. The method as claimed in claim 1, further comprising calculating an average delay correlation value based on a plurality of delay correlation values, and the carrier frequency offset value being determined based on the average delay correlation value.

10. A carrier frequency offset estimation system to estimate a carrier frequency offset value of a received signal comprising a first repeat signal and a second repeat signal, the system comprising:
a conjugate signal generator comprising an interpolation filter and a computing unit, receiving the first repeat signal to generate a first conjugate signal corresponding to the second repeat signal by the interpolation filter and the computing unit;

a first multiplier to calculate a first product of the second repeat signal and the first conjugate signal; and a carrier frequency offset estimator to estimate the carrier frequency offset value based on the first product, wherein the interpolation filter implements an interpolation procedure and the interpolation procedure comprises:

determining data values of a first interpolation point and a second interpolation point based on a first sampling point and a second sampling point of the first repeat signal; and selecting corresponding data values from the data values of the first interpolation point, the second interpolation point, the first sampling point and the second sampling point based on positions of the second repeat signal to generate a first signal.

11. The system as claimed in claim 10, further comprising an average value computing unit receiving a plurality of the first products to calculate a delay correlation value and the carrier frequency offset value based on the delay correlation value.

12. The system as claimed in claim 10, wherein the carrier frequency offset estimator further comprises a phase calculating unit to calculate a phase value based on the first product.

13. The system as claimed in claim 10, wherein the carrier frequency offset estimator further comprises:

a phase calculating unit to calculate a phase value based on the first product;

a second multiplier to calculate a second product of the phase value and a predetermined value; and a subtractor to calculate a difference between the second product and a phase rotation value of the received signal and the carrier frequency offset value based on the difference.

14. The system as claimed in claim 13, wherein the phase rotation value is 0, $2\pi$ or $-2\pi$.

15. The system as claimed in claim 13, wherein the difference is further multiplied by a compensation value.

16. The system as claimed in claim 15, wherein the compensation value is, wherein D is the length of the repeat part in the preamble signal, and Ts is a sampling period of the received signal.

17. The system as claimed in claim 10, wherein the data values of the first interpolation point and the second interpolation point are the data values of the trisection points between the first sampling point and the second sampling point.

18. The system as claimed in claim 10, wherein the computing unit receives the first repeat signal to generate a conjugate signal; and the interpolation filter receives conjugate signal to generate a first conjugate signal.

* * * * *